US005546755A

United States Patent [19]
Krieger

[11] Patent Number: 5,546,755
[45] Date of Patent: Aug. 20, 1996

[54] AUTOMATIC AIR CONDITIONER SHUTOFF SYSTEM

[76] Inventor: Todd N. Krieger, 3420 W. Danbury Dr. C-102, Phoenix, Ariz. 85023

[21] Appl. No.: 399,613

[22] Filed: Mar. 7, 1995

[51] Int. Cl.$^6$ ............... B60H 1/32; F25B 27/00
[52] U.S. Cl. ............... 62/133; 62/243; 62/323.4
[58] Field of Search ............... 62/133, 323.4, 62/243, 126, 161, 163, 230, 158, 180; 123/198 R

[56] References Cited

U.S. PATENT DOCUMENTS

| | | | |
|---|---|---|---|
| 3,462,964 | 8/1969 | Haroldson | 62/133 |
| 4,135,368 | 1/1979 | Mohr et al. | 62/133 |
| 4,237,838 | 12/1980 | Kinugawa et al. | 128/327 |
| 4,269,033 | 5/1981 | Birch | 62/133 |
| 4,299,094 | 11/1981 | Lummen | 62/123 |
| 4,305,258 | 12/1981 | Spencer, Jr. | 62/243 X |
| 4,305,360 | 12/1981 | Meyer et al. | 123/337 |
| 4,359,875 | 11/1982 | Ohtani | 62/133 |
| 4,369,634 | 1/1983 | Ratto | 62/126 |
| 4,445,341 | 5/1984 | Hayashi | 62/133 |
| 4,488,410 | 12/1984 | Seiderman | 62/133 |
| 4,510,764 | 4/1985 | Suzuki | 62/133 |
| 4,610,146 | 9/1986 | Tanemura | 62/133 |
| 4,615,180 | 10/1986 | Rudman | 62/133 |
| 4,658,943 | 4/1987 | Nishikawa et al. | 62/133 X |
| 4,688,530 | 8/1987 | Nishikawa et al. | 62/323.4 X |
| 4,823,555 | 4/1989 | Ohkumo | 62/133 |
| 5,050,395 | 9/1991 | Berger | 62/133 |
| 5,056,326 | 10/1991 | Ohkumo et al. | 62/323.4 x |
| 5,133,302 | 7/1992 | Yamada et al. | 123/41.12 |
| 5,207,609 | 5/1993 | Yashiki et al. | 62/133 |
| 5,259,241 | 11/1993 | Wakayama | 73/117.3 |
| 5,261,368 | 11/1993 | Umemoto | 123/327 |
| 5,262,717 | 11/1993 | Bolegoh | 324/158 MG |
| 5,271,368 | 12/1993 | Fujii et al. | 123/493 |
| 5,304,102 | 4/1994 | Narita et al. | 475/125 |
| 5,415,004 | 5/1995 | Iizuka | 62/133 |
| 5,469,947 | 11/1995 | Anzai et al. | 62/133 X |

FOREIGN PATENT DOCUMENTS 55-151135  11/1980  Japan.

*Primary Examiner*—Harry B. Tanner
*Attorney, Agent, or Firm*—Richard C. Litman

[57] ABSTRACT

An automotive air conditioner shutoff system that disengages the air conditioner compressor when the value of a parameter indicative of the vehicle's performance is below a certain variable threshold. The threshold varies as a continuous function of accelerator pedal position or throttle valve position. In addition, the air conditioner fan may also be controlled by the air conditioner shutoff system of the present invention. Further, the air conditioner shutoff system of the present invention may act to shut off the air conditioner when the engine is overheated or when the engine has not yet warmed up or stabilized. Additionally, the vehicle operator can modify the value of the variable threshold for the performance indicating parameter, and entirely override the air conditioning shutoff system.

20 Claims, 9 Drawing Sheets

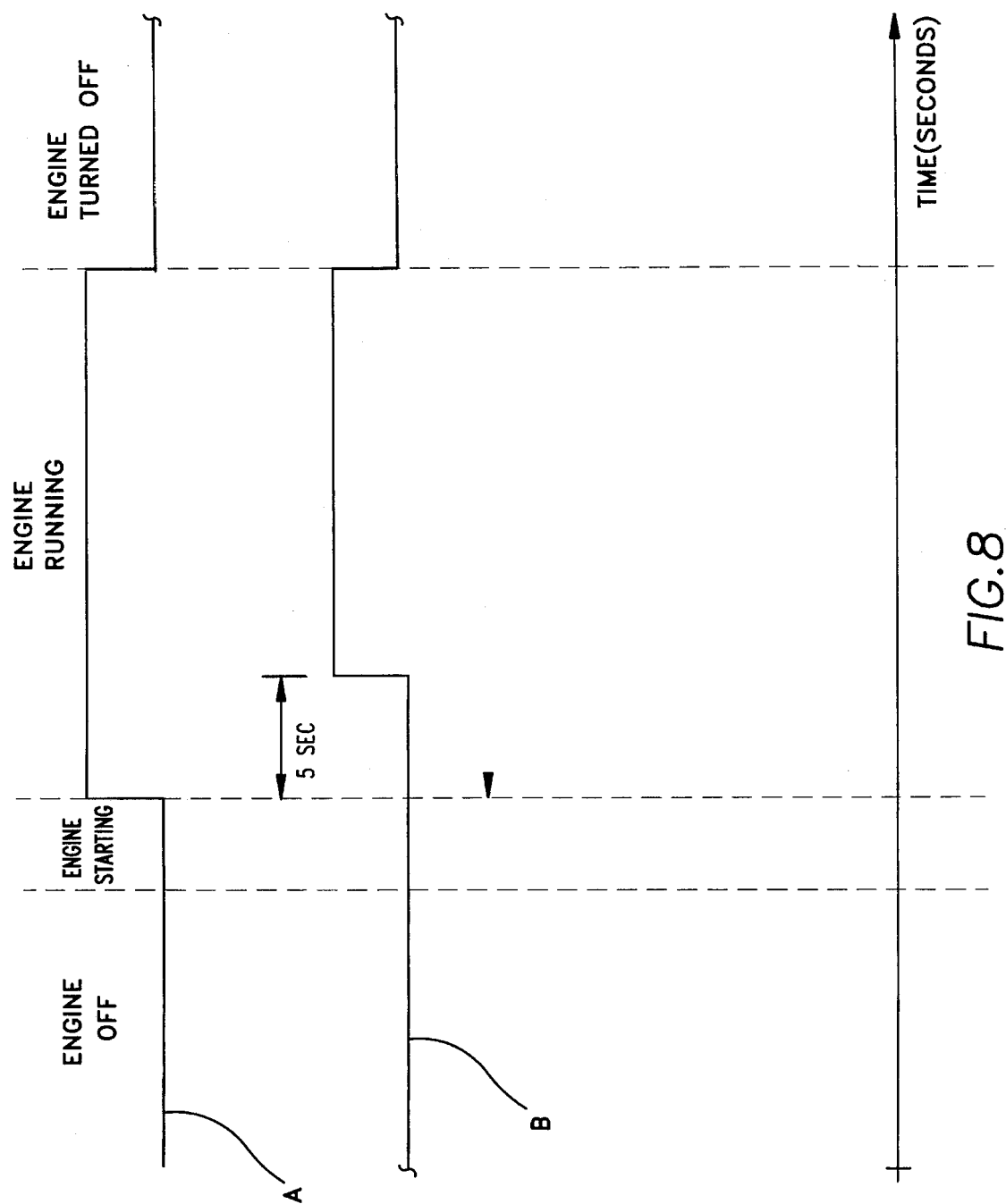

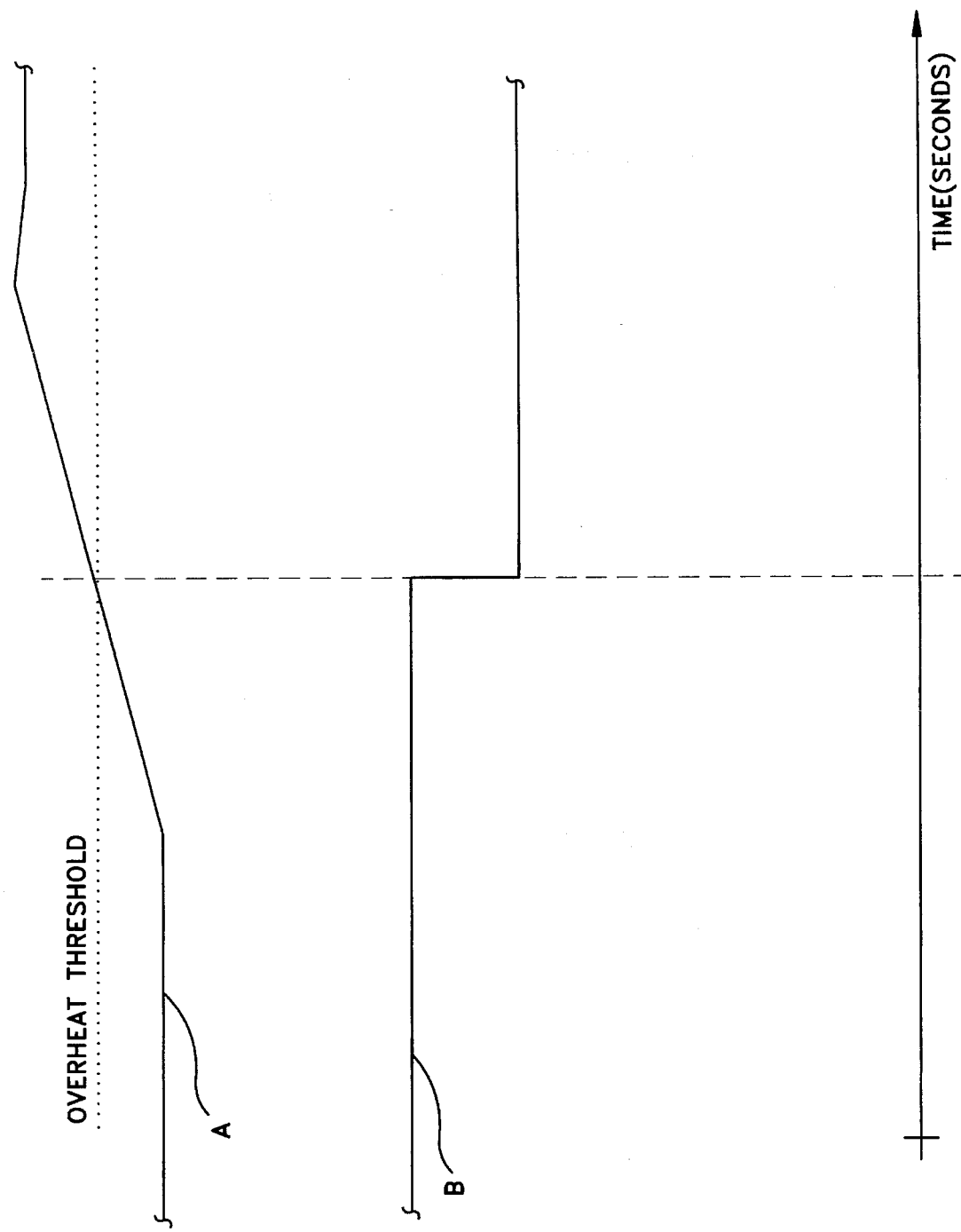

AUTOMATIC AIR CONDITIONER SHUTOFF SYSTEM

BACKGROUND OF THE INVENTION

1. Field of the Invention

The present invention relates to a control system for an automotive air conditioning unit. More particularly, the present invention relates to a control system which acts to disengage an air conditioner from the power train of a vehicle when engine power is needed for other uses such as, accelerating, travelling uphill, and towing heavy payloads.

2. Description of the Prior Art

In all motorized vehicles with air conditioning systems, the power available, for example for acceleration and traveling uphill, is reduced when the air conditioning system is turned on. With the increase in consumer demand for cars with greater fuel economy, there has been a great rise in the popularity of cars with smaller engines, in particular cars with small four cylinder engines. Such small engines have more limited power outputs than, for example, the large eight cylinder engines popular in the recent past.

Because of the limited power of such small engines, it is often impossible, in cars with such engines, to accelerate quickly or to travel uphill at a reasonable speed, with the air conditioner on. Also, in the case of police vehicles for example, when the quickest possible acceleration is required, it is desirable to direct all available power to the drive wheels without the need for the vehicle operator's intervention. For these reasons, many systems have been proposed in the prior art for automatically turning off a vehicle's air conditioner when the demand for engine power is high.

U.S. Pat. No. 5,271,368, issued to Fujii et al., shows a fuel supply control system which cuts off fuel supply to the engine during deceleration when the engine speed is higher than a first preset value with the air conditioner on, and when the engine speed is higher than a second preset value with the air conditioner off, the first preset value being greater than the second preset value.

U.S. Pat. No. 5,261,368, issued to Umemoto, shows an engine control system for preventing engine stall when the engine returns from operating under a load to an idling condition. The Umemoto system supplies auxiliary air to the engine, to prevent the engine speed from dropping below the idle setting in the period of time immediately following the return of the throttle valve to the idling position.

U.S. Pat. No. 5,133,302, issued to Yamada et al., shows a control system, for controlling the cooling fan of an engine, which uses the vehicle speed, coolant temperature, and refrigerant pressure at the compressor discharge outlet, to determine whether the cooling fan should be on or off.

U.S. Pat. No. 5,050,395, issued to Berger, shows a an air conditioning shutoff system that uses the difference between fuel consumption per stroke at idle and actual fuel consumption per stroke, as the criterion for shutting off the vehicle's air conditioner. In addition, the Berger system uses engine RPM, vehicle speed, and accelerator pedal position, as further parameters for determining when to shutoff the air conditioner. All the aforementioned additional parameters have preset thresholds, and the air conditioner is not shutoff if the value for any one of these parameters is above its preset threshold.

U.S. Pat. No. 5,027,609, issued to Yashiki et al., shows an air conditioning shutoff system where the air conditioner is shutoff when the intake pressure is above a certain threshold. In the Yashiki et al. system, the intake pressure threshold is dynamically varied depending on engine RPM and ambient pressure.

U.S. Pat. No. 4,823,555, issued to Ohkumo, shows an air conditioner shutoff system which compares the actual engine intake pressure to a reference pressure which is a function of the vehicle's speed, and shuts off the air conditioner if the intake pressure is higher than the reference pressure at a particular vehicle speed.

U.S. Pat. No. 4,688,530, issued to Nishikawa et al., shows an air conditioning shutoff system which operates to shutoff the air conditioner compressor when the vehicle is in a low speed range and the throttle opening is less than a reference amount. The purpose of this control system is to eliminate engine vibrations when the vehicle's automatic transmission down-shifts at low speed, with the air conditioner running.

U.S. Pat. No. 4,658,943, issued to Nishikawa et al., shows an air conditioner shutoff system which uses the data from the electronic controller of the vehicle's automatic transmission to determine whether the throttle opening and the vehicle speed are within a "prohibition region" within the shift map stored in the transmission controller. If the values for the vehicle speed and throttle opening are within the "prohibition region" and certain other requirements, regarding the selected gear and the elapsed time kept by a timer are met, then the air conditioner is shutoff. Also the air conditioner is shutoff if the engine speed in rpm is below a reference value.

U.S. Pat. No. 4,615,180, issued to Rudman, shows an inertial mercury switch which tilts in response to vehicle acceleration, and causes an open circuit when tilted. By incorporating this switch in the circuit supplying power to the air conditioner compressor clutch, the air conditioner compressor can be cut out during vehicle acceleration, thereby making more engine power available for acceleration. The Rudman system fails to cut out the air conditioner when towing a heavy load at constant speed, a condition which also requires greater engine power output.

U.S. Pat. No. 4,610,146, issued to Tanemura, shows a an air conditioning shutoff system that uses fuel temperature to determine when the engine is running under a heavy load. In addition, the Tanemura system incorporates a detector for detecting the amount of accelerator pedal depression, and a speed sensor. When the fuel temperature is higher than a certain level, the accelerator pedal is depressed further than a preset amount, and the vehicle speed is below a preset level, the system of Tanemura acts to shutoff the air conditioner compressor.

U.S. Pat. No. 4,510,764, issued to Suzuki, discloses an air conditioning cut-off where during acceleration or high load operation the power supplied to the air conditioner is reduced or eliminated. Suzuki uses the intake pressure of the engine to detect high load operation. Suzuki does not disclose how his system determines whether or not the vehicle is accelerating.

U.S. Pat. No. 4,488,410, issued to Seiderman, shows an air conditioner cut-off system which uses an on-off switch, actuated by the gear shift lever, to turn off the air conditioner while the transmission is being shifted between neutral and high gear. Presumably, as the transmission is being shifted through the low gears, demand for engine power is high and the air conditioner should be turned off.

U.S. Pat. No. 4,445,341, issued to Hayashi, shows an air conditioner cut-off which uses the engine air intake vacuum to determine whether or not the vehicle is under acceleration and, in response to a determination that the vehicle is accelerating, turns off the air conditioner.

U.S. Pat. No. 4,369,634, issued to Ratto, shows another example of an air conditioner cut-off which uses the engine air intake vacuum to determine whether or not there is a demand for high engine power, and turns off the air conditioner when there is a demand for high engine power.

U.S. Pat. No. 4,359,875, issued to Ohtani, shows an air conditioning cut-off which uses engine intake vacuum to determine when the vehicle is in a condition other than standing still or travelling at constant velocity. The air conditioner is then turned off when the intake manifold pressure is greater than −150 mmHg.

U.S. Pat. No. 4,305,360, issued to Meyer et al., shows a control system for automatically setting the idle speed of the engine. The Meyer et al. system automatically opens the throttle valve, when the engine speed drops below the idle speed setting, to a position which brings the engine speed up to the idle speed setting.

U.S. Pat. No. 4,299,094, issued to Lummen, shows an air conditioner cut-off system which uses a mercury switch to turn the air conditioner on and off. Again the mercury switch is responsive to engine intake vacuum.

U.S. Pat. No. 4,269,033, issued to Birch, shows a pressure sensitive switch for turning off the air conditioner in response to high intake manifold pressure. The pressure sensitive switch of Birch has an adjustment screw which allows the degree of vacuum, which causes the air conditioner to be turned off, to be set by the vehicle operator.

U.S. Pat. No. 4,237,838, issued to Kinugawa et al., shows an engine control system that regulates the amount of air flowing into the engines intake manifold.

U.S. Pat. No. 4,135,368, issued to Mohr et al., shows an air conditioner cut-off which turns off the air conditioner in response to high engine intake pressure, and turns on the air conditioner after a pre-programmed time of three to seven seconds.

U.S. Pat. No. 3,462,964, issued to Haroldson, shows a pressure sensitive switch for turning off the air conditioner in response to high intake manifold pressure.

Japanese Patent Document Number 55-151135 shows a control system for controlling the supply of auxiliary air to the intake manifold of an engine.

None of the above inventions and patents, taken either singly or in combination, is seen to describe the instant invention as claimed.

SUMMARY OF THE INVENTION

The present invention is directed to an automotive air conditioner shutoff system that disengages the air conditioner compressor when the value of a parameter indicative of the vehicle's performance is below a certain variable threshold. The threshold varies as a continuous function of accelerator pedal position or throttle valve position. In addition, the air conditioner fan may also be controlled by the air conditioner shutoff system of the present invention. Further, the air conditioner shutoff system of the present invention may act to shut off the air conditioner when the engine is over heated or when the engine has not yet warmed up. Additionally, provision is made for allowing the vehicle operator to modify the value of the variable threshold for the vehicle performance indicating parameter, and for allowing the vehicle operator to entirely override the air conditioning shutoff system.

Accordingly, it is a principal object of the invention to provide an air conditioner shutoff system which makes maximum engine power available, for acceleration and hill climbing for example, when the air conditioner is running, without the need for operator intervention.

It is another object of the invention to provide an air conditioner shutoff system which improves vehicle gas mileage by temporarily disengaging the air conditioner compressor from the power train, when the engine is operating under a high demand for power output.

It is a further object of the invention to provide an air conditioner shutoff system which disengages the air conditioner compressor in the period immediately following engine start-up, thus reducing the burden on the engine while it is warming up and increasing engine life.

Still another object of the invention is to provide an air conditioner shutoff system which greatly reduces the possibility of engine overheating when demand for engine power is high and the air conditioner is running.

Still another object of the invention is to provide an air conditioner shutoff system which can be readily retrofitted in existing vehicles.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 8 is a graph showing the temporal relationship between the detection of the engine being in a running condition and the on/off state of the air conditioner.

FIG. 9 is a graph showing the temporal relationship between the engine or coolant temperature and the on/off state of the air conditioner.

DETAILED DESCRIPTION OF THE PREFERRED EMBODIMENTS

Figure 1:
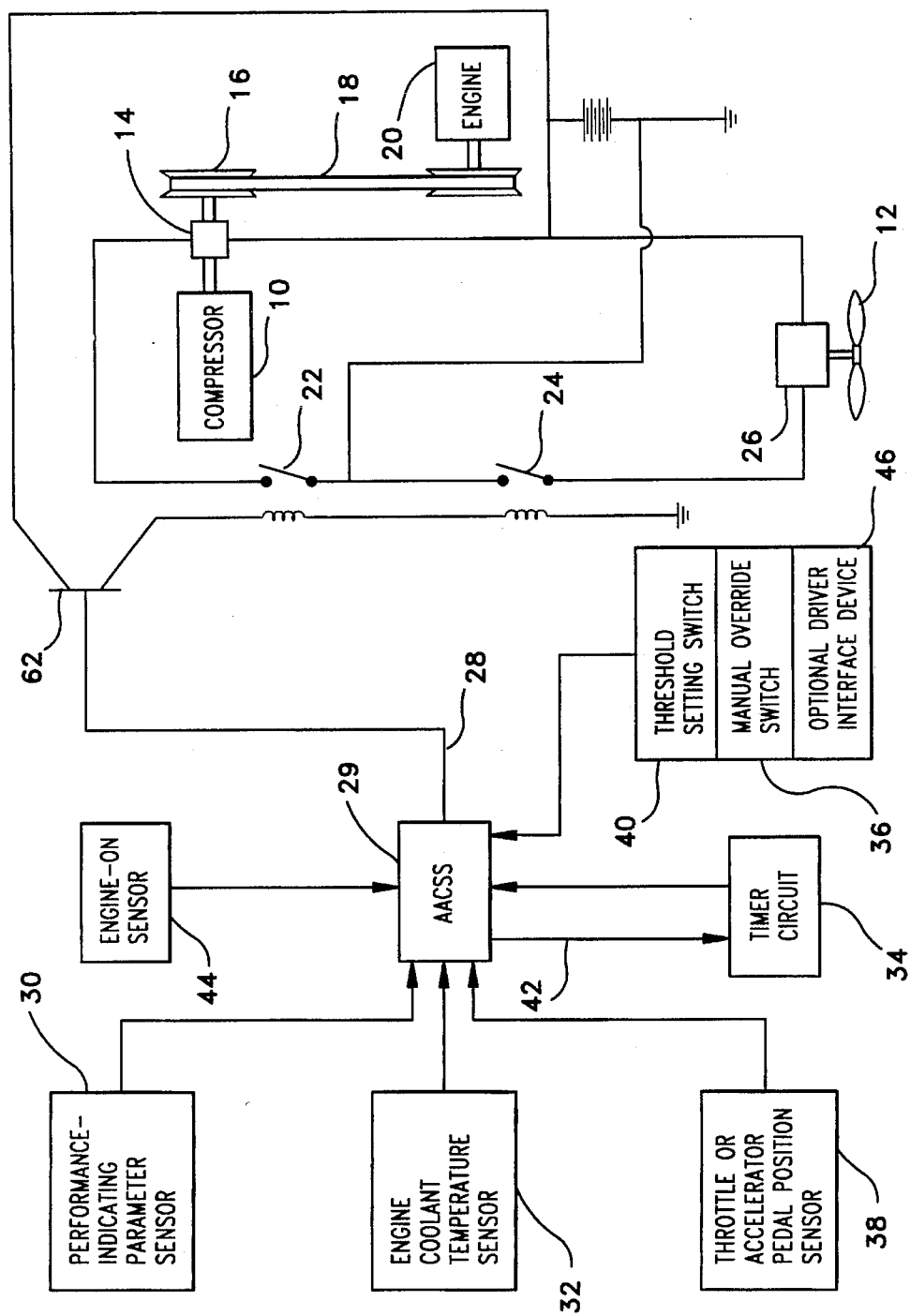
FIG. 1 is a schematic view of the automatic air conditioner shutoff system of the present invention.

Referring to FIG. 1, a schematic diagram of an internal combustion engine vehicle equipped with an air conditioner and incorporating the automatic air conditioner shutoff system of the present invention can be seen. Generally, the overwhelming portion of the energy consumed by an air conditioning system is consumed by compressor 10 which acts to compress the refrigerant after the refrigerant has passed through an expansion valve. A less significant amount of energy is consumed by the air conditioner fan 12 which circulates air passed the cooling coils of the air conditioner. To achieve the goals of the present invention, it is sufficient for the automatic air conditioner shutoff system of the present invention to disengage the compressor only. However, if desired, the automatic air conditioner shutoff system of the present invention can also be used to shut off the air conditioner fan.

The details of the air conditioning system itself are well known, and therefore are not shown in the drawings.

The compressor is generally driven via an electromagnetic clutch 14 interposed between a pulley 16 and the compressor 10. A belt 18 engages the pulley 16, and drives the pulley 16 using power from the engine 20. When the electromagnetic clutch 14 is energized, the compressor is engaged to the pulley and is driven by the engine. A relay switch 22 acts to selectively deliver or interrupt electrical power supply to the electromagnetic clutch 14. A similar relay switch 24 controls the delivery of electrical power to the electric motor 26 driving the air conditioner fan 12. The relay switch 24 controlling the fan is preferably in parallel with the relay switch 22 controlling the power to the electromagnetic clutch. Both relay switches are controlled by the same control signal line 28 from the automatic air conditioner shutoff system 29, referred to herein by the acronym AACSS.

The AACSS receives input signals from a performance-indicating parameter sensor 30, an engine coolant temperature sensor 32, a timer circuit 34, a manual override switch 36, throttle or accelerator pedal position sensor 38, and a threshold setting switch 40. The AACSS outputs a reset signal 42 to the timer circuit in order to reset the timer 34 as necessitated by the control algorithm which will be discussed below. The AACSS itself includes a microcomputer, input/output circuitry, and analog to digital converter circuitry for converting transducer inputs to digital signals. The microcomputer includes memory circuits, a central processing unit (CPU), registers for temporary data storage within the CPU, comparator circuitry, and arithmetic circuitry. The memory circuits include both read only memory (ROM) and random access memory (RAM). The aforementioned component circuits of the AACSS are all well known in the art and therefore are not shown in the drawings or discussed in detail herein.

Most preferably, the AACSS is installed so as to be automatically engaged when the vehicle is started. In addition, preferably the AACSS draws power from the vehicle battery so that it can perform the necessary shut-down routines when the engine is turned off.

Figure 2:
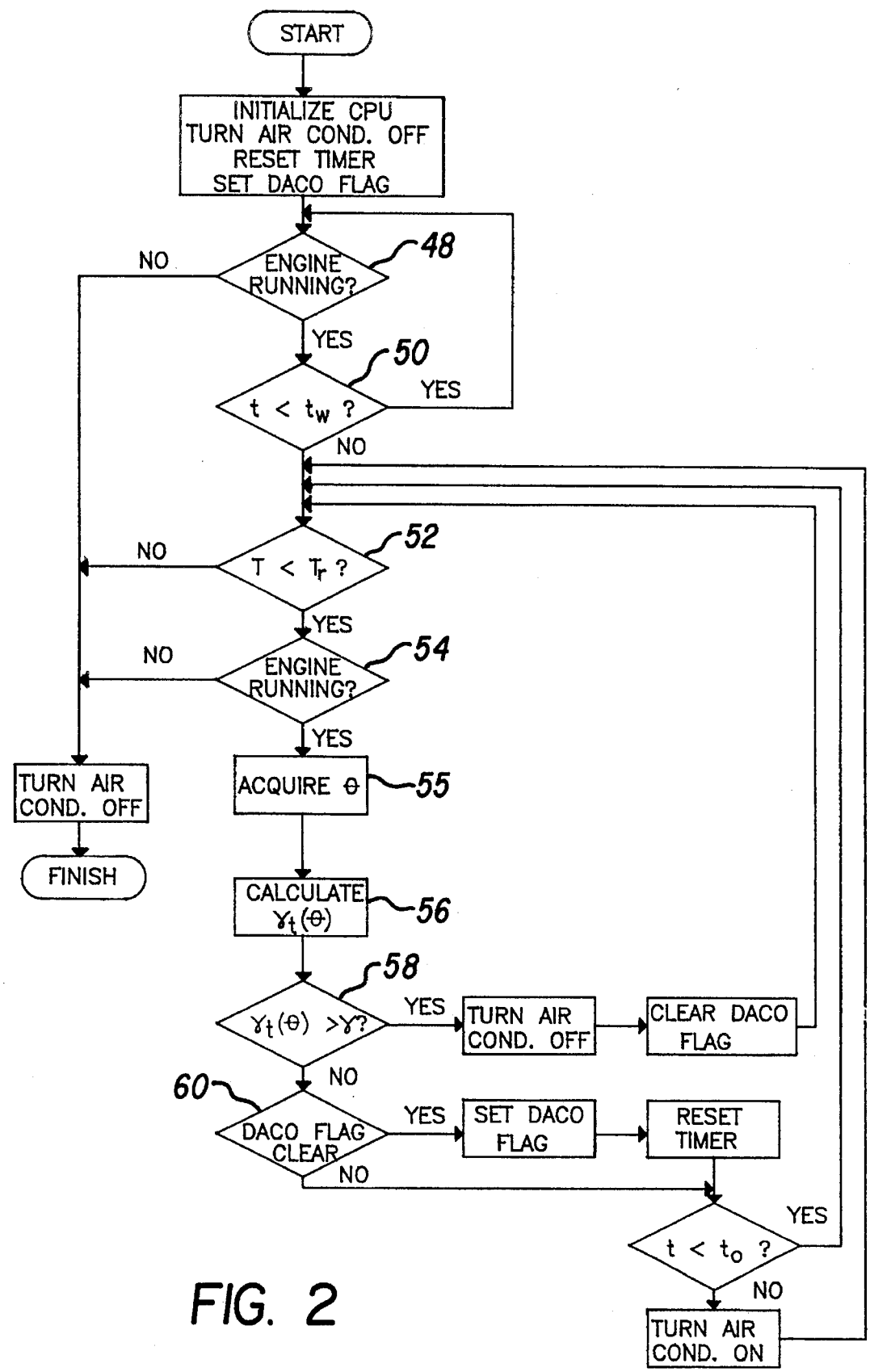
FIG. 2 is a flow chart showing the control algorithm used in the automatic air conditioner shutoff system of the present invention.

Referring to FIG. 2, the algorithm followed by the AACSS can be seen. When the engine is first started, the CPU is initialized to ensure that the relay switches are in the open position, i.e. the compressor and the fan are shut off, when the running of the algorithm is initiated. During this initial state the signal on signal line 28 is said to be off or in the off state. Also, immediately following the starting of the engine, the timer circuit 34 is reset, i.e. set to zero. This initialization phase further includes a step of setting a bit within the CPU. This bit is allocated for the purpose of implementing a delay before allowing the compressor and fan to turn on, following a determination that there is no longer a high demand for engine output. This bit is referred to as the "delay air conditioner on" flag or DACO flag.

In step 48, it is determined if the engine is running or not. If the engine is running, program execution is continued. Otherwise the program is terminated. Whether or not the engine is running can for example easily be determined by monitoring the alternator output using conventional current measuring means. The subsystem for determining whether or not the engine is running is designated as the engine-on sensor 44.

Thereafter, in step 50 the elapsed time t is compared to the preselected stabilization time interval $t_w$. If t is less than $t_w$, the air conditioner is maintained in the inoperative state. The time interval $t_w$ can range from 3 to 10 seconds, and can either be entered into ROM at the time of system installation or can be entered by the vehicle operator using a conventional input device such as a keypad (shown as optional driver interface device 46, in FIG. 1). The reason for the delay $t_w$, is to increase engine life by preventing the engagement of the compressor and the turning on of the fan, before the engine has had a chance to reach stable running condition. By stable running condition, it is meant that parameters, such as engine temperature and oil pressure, have reached normal operating levels.

Steps 48 and 50 are repeated until t becomes greater than or equal to $t_w$, at which time program execution continues to step 52. In step 52 the coolant temperature T is compared to the reference value $T_r$. If T is greater than or equal to $T_r$, an engine overheat condition exists and the air conditioner compressor and fan should be kept off. This step helps prevent further overheating of the engine and allows the engine to return to normal operating temperature more quickly. The reference value $T_r$ represents the upper limit of the normal operating temperature range of the engine and varies depending on the particular engine design. The value of $T_r$ can be readily obtained by reference to the manufacturers specifications for the particular engine.

If the engine is overheated the air conditioner is turned off and the program is terminated. As an alternative, step 52 is repeated as long as T remains above $T_r$. In either case, if the engine is not overheated, program execution continues to step 54.

In step 54, whether or not the engine is running is again ascertained. If the engine is running, program execution is continued to step 55. Otherwise the program is terminated as before.

In step 55 the value of the power demand indicating parameter θ, i.e. the throttle position or the accelerator pedal position, is acquired. At step 56 the threshold value $γ_T(θ)$ for the performance-indicating parameter γ is calculated. The threshold value for the performance indicating parameter is given by reducing the ideal value of the parameter $γ_i(θ)$ by a certain percentage. The ideal value of the performance indicating parameter is the steady state value, on level ground, for the parameter at the previously acquired value of throttle or accelerator pedal position θ. The ideal values of the performance indicating parameter are stored in memory, for discrete points distributed over the entire range of throttle or accelerator pedal positions. The greater the number data points stored in memory, the more accurately the AACSS can control the air conditioner. With the low cost high density memory circuits and flash RAM cards currently available, it should be an inexpensive proposition to store at least on the order of several thousand data points. Alternatively regression equations correlating the ideal value data may be programmed into the microcomputer and used to calculate the ideal values over a continuum of power demand indicating values. To calculate $\gamma_T(\theta)$, $\gamma_i(\theta)$ is "looked up" in memory for the stored $\theta$ closest to the acquired value of $\theta$. Alternatively, some sort of interpolation scheme may be used to find $\gamma_i(\theta)$, or $\gamma_i(\theta)$ may be calculated using the previously mentioned regression equations. The value for $\gamma_i(\theta)$ is then multiplied by the quantity $(100-\delta)/100$, where $\delta$ is the percentage reduction in $\gamma_i(\theta)$, in order to obtain the value for $\gamma_T(\theta)$.

The percentage reduction $\delta$ is entered by the vehicle operator using the threshold setting switch 40. The threshold setting switch 40 can for example be of the sliding type which allows $\delta$ to be continuously varied over a range of 1% to 100%. The actual value of $\delta$ would depend on the vehicle operator's driving style. If the operator values performance more than cabin interior comfort, he or she would pick a relatively small value for $\delta$. In this case even small reductions in the value of the performance indicating parameter, as compared to its ideal value, would cause the air conditioner to be shut off. If on the other hand, the operator would rather compromise performance in the interest of cabin interior comfort, then a relatively higher value for $\delta$ would be selected. In this case a greater reduction in the value of the performance indicating parameter, as compared to its ideal value, would be required to cause the air conditioner to be shut off.

After $\gamma_T(\theta)$ is calculated, the real time value of the performance-indicating parameter $\theta$ is compared to $\gamma_T(\theta)$ in step 58. If the real time $\gamma$ is less than $\gamma_T(\theta)$, then the air conditioner is maintained in the inoperative state, the DACO flag is cleared, and control of program execution is returned to step 52. If the real time $\gamma$ is greater than or equal to $\gamma_T(\theta)$, program execution continues to step 60.

In step 60, the value of the DACO flag is tested. If the DACO flag is clear; then the DACO flag is set, the timer circuit is reset, and t is compared to $t_o$, where $t_o$ is the delay before turning the air conditioner on. If t is less than $t_o$ then the test loop is run again while the air conditioning remains off during the $t_o$ time interval. If the DACO flag is set, i.e. is equal to logical one, then the steps of setting the DACO flag and resetting the timer circuit are skipped, and t is again compared to $t_o$. This process is repeated until t becomes equal to or greater than $t_o$, at which time the signal on signal line 28 goes on.

The delay $t_o$ ranges from 1–3 seconds, and is intended to prevent the turning on of the air conditioner due to highly transitory increases in the performance indicating parameter to above-threshold values, as happens when shifting gears for example, thus saving wear and tear on the electromagnetic clutch, compressor, and fan.

When the signal on signal line 28 goes on, current is allowed to flow through the transistor 62, thus closing relay switches 22,24 and causing the compressor to be engaged and the fan to be turned on, effectively turning on the air conditioner. As an alternative, a silicon controlled rectifier may be used in place of transistor 62. Control of program execution is then returned to step 52.

The parameter $\gamma$ is selected, depending on the particular embodiment, from the group consisting of vehicle speed, engine speed (i.e. engine rpm), and torque measured at the drive axle. Depending upon the choice for the performance-indicating parameter $\gamma$, the sensor 30 will be a vehicle speed sensor, an engine speed sensor, or an axle torque sensor. All these various sensors are well known in the art and will not be shown or discussed in detail here.

U.S. Pat. No. 5,304,102, issued to Narita et al. and incorporated herein by reference, shows an engine speed sensor and output shaft torque sensor of the types useful in the present invention. U.S. Pat. No. 5,259,241, issued to Wakayama and incorporated herein by reference, shows a vehicle speed sensor of the type useful in the present invention. U.S. Pat. No. 5,262,717, issued to Bolegoh and incorporated herein by reference, shows a shaft torque sensor of the type most preferably used in the present invention.

Figure 3:
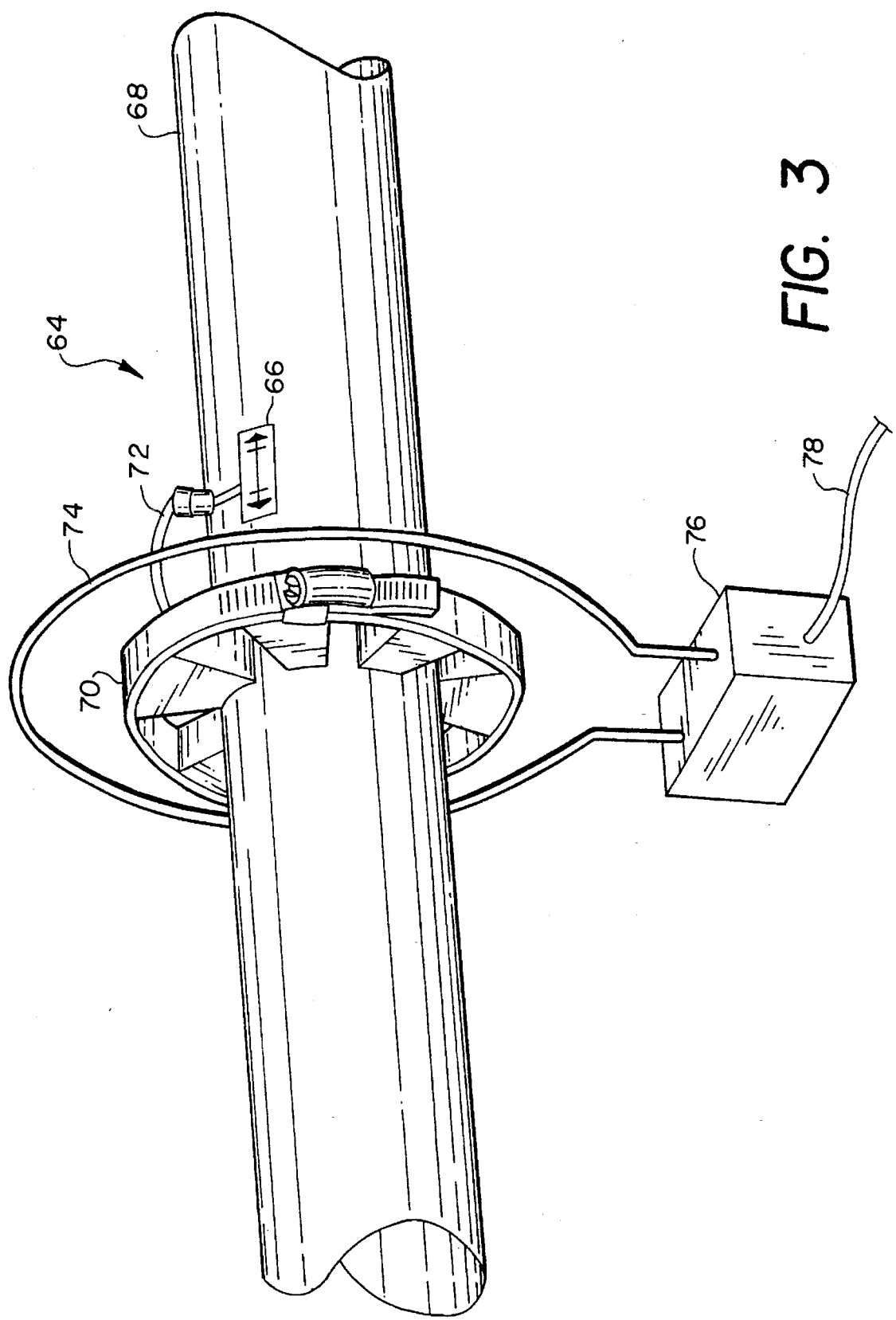
FIG. 3 is a fragmentary perspective view showing the torque sensor most preferably used with the automatic air conditioner shutoff system of the present invention.

Referring to FIG. 3, the torque sensor 64 most preferably used with the present invention can be seen. This torque sensor is of the same type as disclosed in U.S. Pat. No. 5,262,717, which was previously incorporated by reference. The torque sensor includes a strain gauge 66 which is cemented to, or in some other manner affixed to, the propeller shaft or drive axle 68 of a vehicle. The torsional strain in the shaft 68, which is proportional to the torque exerted through the shaft, causes a strain in the strain gauge. The strained state of the strain gauge generates an electrical signal which is conducted to a rotary antenna 70 via conductor 72. The rotary antenna is so called because it is fixed to the shaft and rotates with it. A stationary antenna 74 encircles the shaft 68, and picks up the strain gauge signal. The strain gauge signal is then conducted via a power supply 76 and cable 78 to the AACSS for use in the control program. For details of the construction and calibration of the torque sensor 64 reference is made to U.S. Pat. No. 5,262,717.

The AACSS can be designed to incorporate, as much as possible, a vehicles existing equipment, such as sensors and on-board computers, thus allowing it to be readily retrofitted to existing vehicles having electronically controlled automatic transmissions or computerized engine control systems. All of the subsystems and circuits shown in the figures in block form are well known in the art and can be readily obtained.

Figure 4:
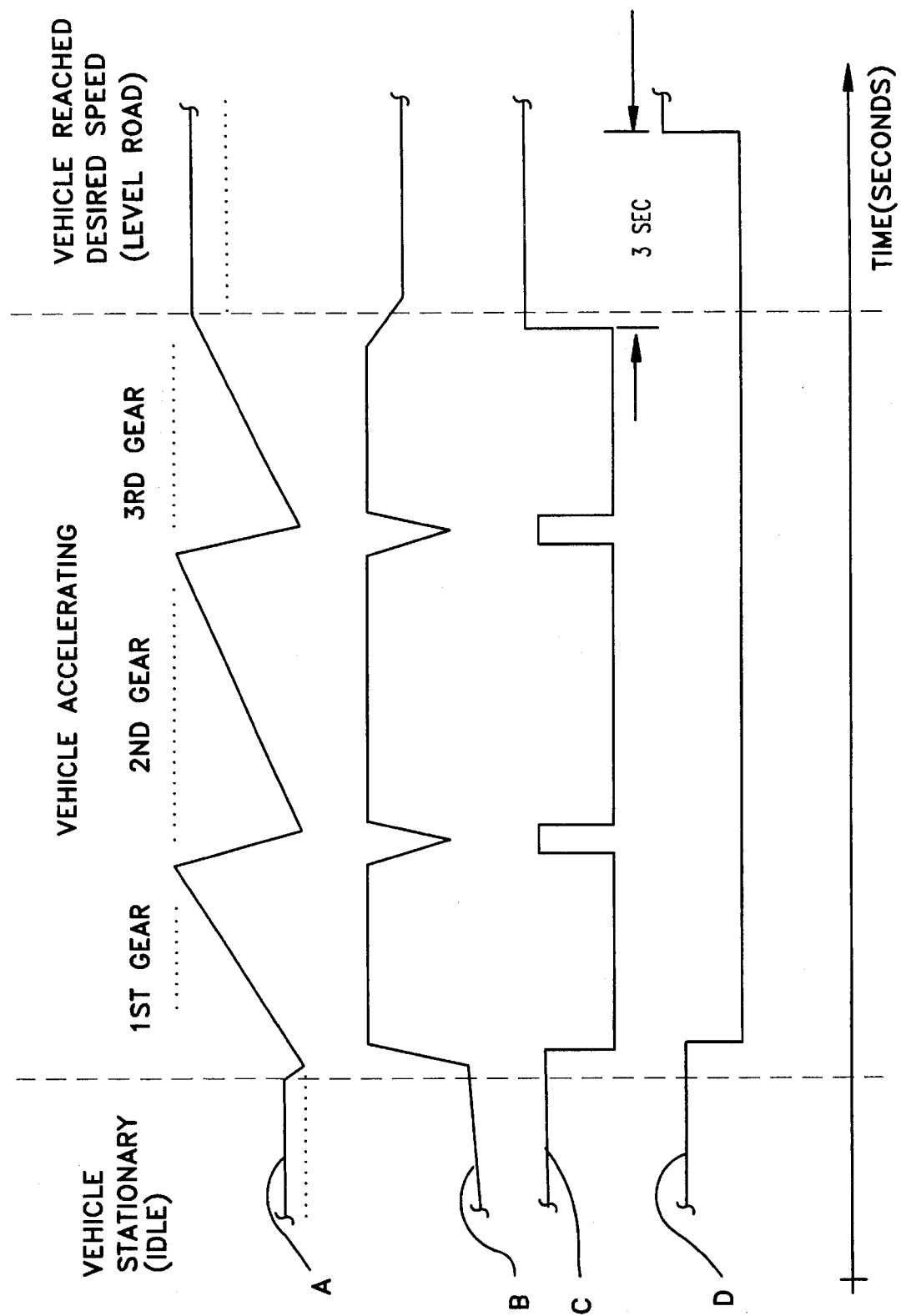
FIG. 4 is a graph demonstrating the temporal relationship between the performance indicating parameter, the power demand indicating parameter, and the state of the vehicle's air conditioner, for an AACSS equipped, manual transmission vehicle during acceleration on level ground.

FIG. 4, shows a graph demonstrating the temporal relationship between the performance indicating parameter, the power demand indicating parameter, and the state of the vehicle's air conditioner, for an AACSS equipped, manual transmission vehicle during acceleration on level ground. Only three gear changes are shown for clarity. Curve A shows the engine speed in rpm, which is the performance indicating parameter in this example. Curve B shows the accelerator pedal position, which is the power demand indicating parameter in this example. Curve C is a logical depiction of whether the realtime value of the engine speed is above or below threshold, logical "high" indicating an above threshold value and a logical "low" indicating a below-threshold value. Curve D shows the state of the air conditioner, "high" meaning the air conditioner is on and "low" meaning the air conditioner is off. The horizontal dotted lines show the calculated thresholds for the engine speed at the particular accelerator pedal positions.

At first the vehicle is travelling in first gear at the ideal engine speed for the given pedal position. At this time the engine speed is above the threshold value and the air conditioner is on. As acceleration begins the accelerator pedal is deeply depressed. As shown in curve B, the threshold value at this new accelerator pedal position is far higher than before and the realtime engine speed is now well below the threshold indicating a high demand for power. At this time curve C goes low indicating that the condition for shutting off the air conditioner is now met, and curve D goes low indicating that the air conditioner is now off.

As the vehicle accelerates further the need for gear changes arise. During these gear changes the operator's foot is lifted from the accelerator pedal, and the engine speed momentarily is above the calculated threshold value. This phenomenon is manifested by the curve C going high briefly with each gear shift. However, since the duration of each episode of curve C being high, is less than $t_o$, 3 seconds in this example, the air conditioner remains off. Once the desired speed is reached in third gear, the operator eases off the accelerator pedal, however the accelerator pedal remains more deeply depressed than it was initially. Once again the engine speed is above the threshold speed, since now the engine speed is at the ideal level. This time the duration of the condition for turning the air conditioner on is greater than 3 seconds, and therefore the air conditioner is turned on as seen in curve D.

Figure 5:
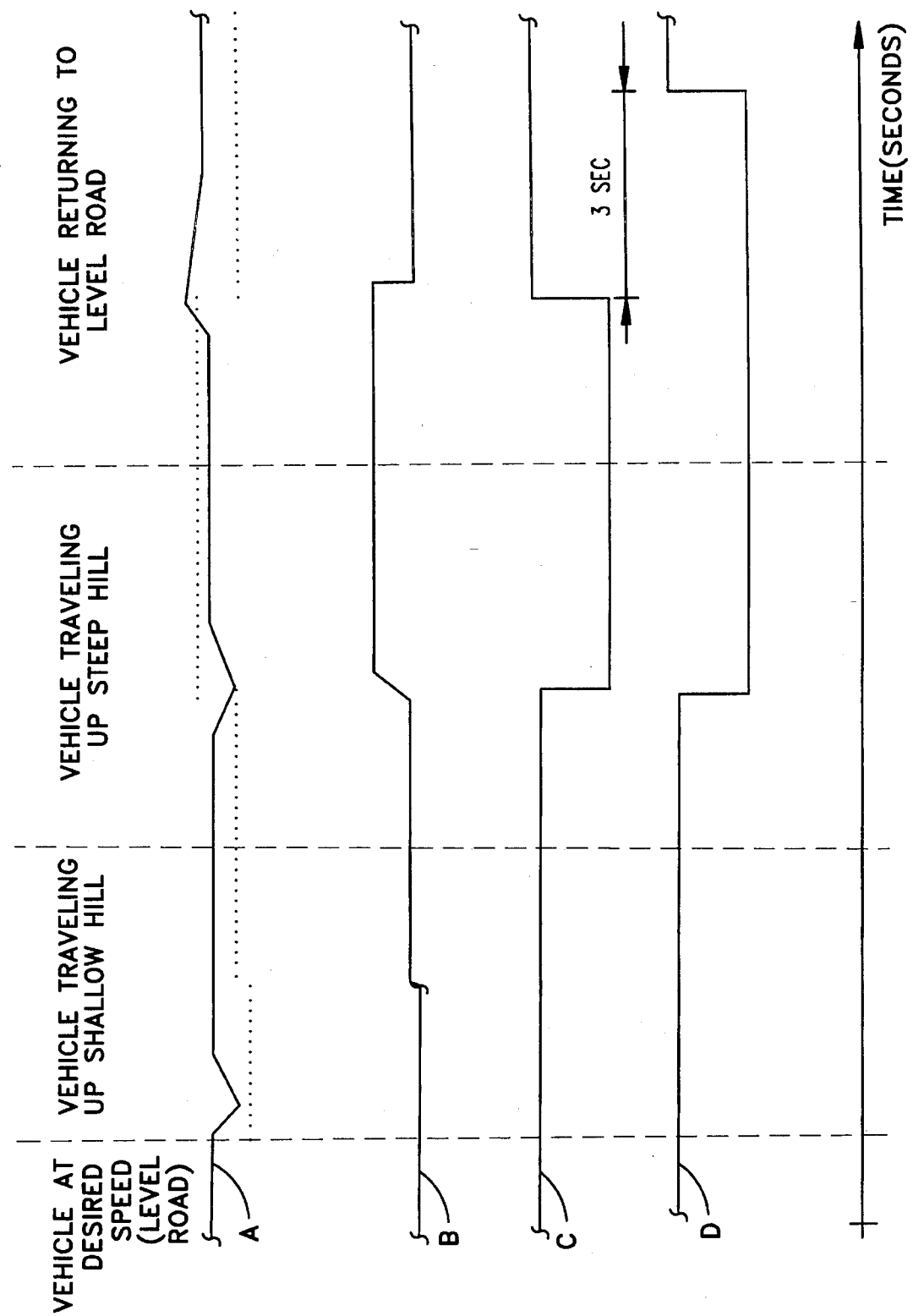
FIG. 5 is a graph demonstrating the temporal relationship between the performance indicating parameter, the power demand indicating parameter, and the state of the vehicle's air conditioner, for an AACSS equipped, manual transmission vehicle during travel on shallow and steep hills.

FIG. 5, shows a graph demonstrating the temporal relationship between the performance indicating parameter, the power demand indicating parameter, and the state of the vehicle's air conditioner, for an AACSS equipped, manual transmission vehicle during travel on shallow and steep hills. Curve A shows the engine speed in rpm, which is the performance indicating parameter in this example. Curve B shows the accelerator pedal position, which is the power demand indicating parameter in this example. Curve C is a logical depiction of whether the realtime value of the engine speed is above or below threshold, logical "high" indicating an above threshold value and a logical "low" indicating a below-threshold value. Curve D shows the state of the air conditioner, "high" meaning the air conditioner is on and "low" meaning the air conditioner is off. The horizontal dotted lines show the calculated thresholds for the engine speed at the particular accelerator pedal positions.

At first the vehicle is travelling on a level road at the ideal engine speed. At this time the engine speed is above the threshold value and the air conditioner is on. At steady state on a shallow hill the accelerator pedal is more deeply depressed, however, because of the effect of δ discussed above, the engine speed is still above the threshold even though it is less than the ideal speed. The air conditioner remains on.

When climbing a steep hill, the accelerator pedal is even more deeply depressed, and eventually the engine speed falls below the calculated threshold value. The realtime engine speed is now well below the threshold indicating a high demand for power. At this time curve C goes low indicating that the condition for shutting off the air conditioner is now met, and curve D goes low indicating that the air conditioner is now off.

As the vehicle comes to level ground, the operator eases off the accelerator pedal. Once again the engine speed is above the threshold speed, since now the engine speed is at the ideal level. Once the vehicle has travelled on level ground for more than 3 seconds, the duration of the condition for turning the air conditioner on is greater than 3 seconds, and therefore the air conditioner is turned on as seen in curve D.

Figure 6:
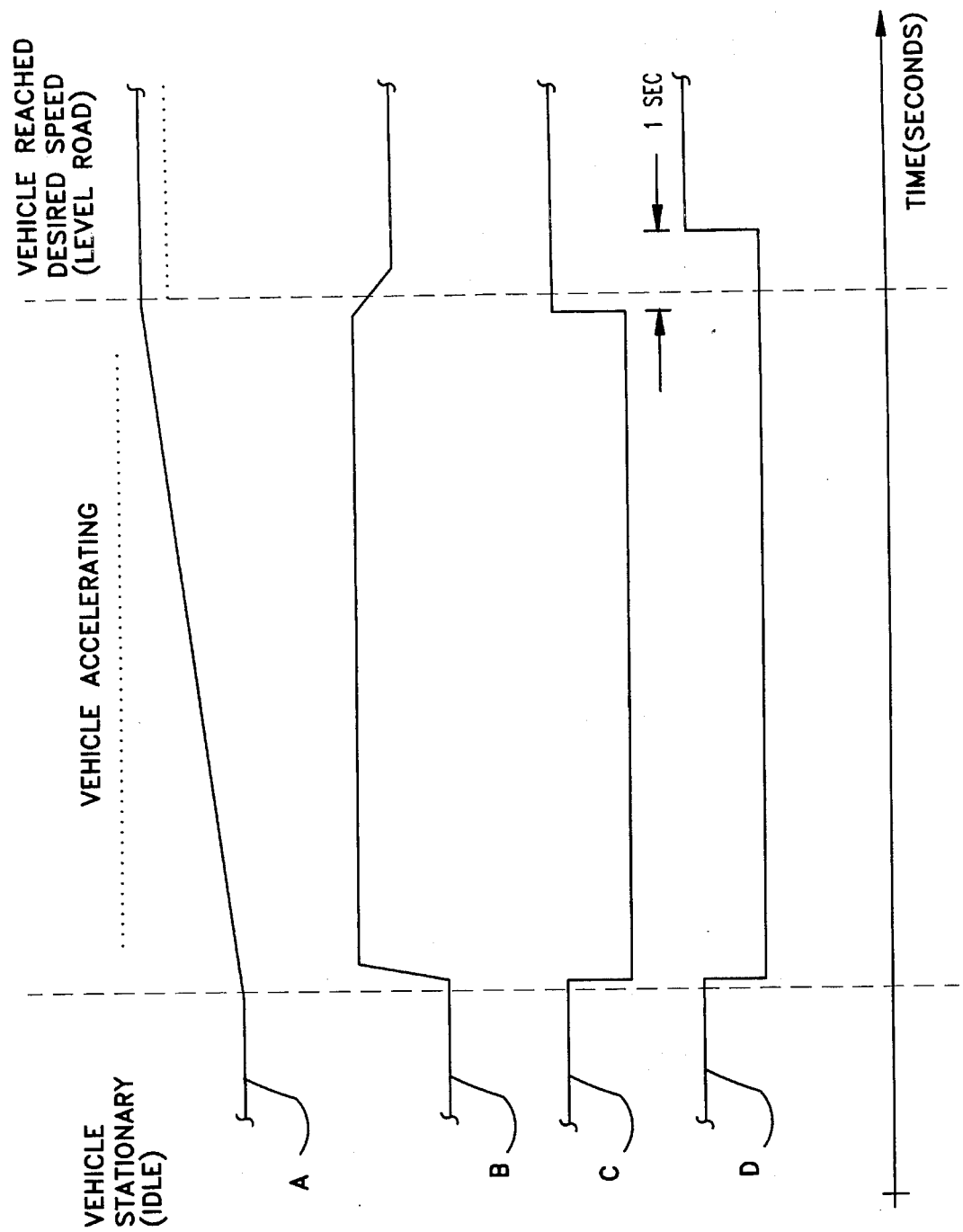
FIG. 6 is a graph demonstrating the temporal relationship between the performance indicating parameter, the power demand indicating parameter, and the state of the vehicle's air conditioner, for an AACSS equipped, automatic transmission vehicle during acceleration on level ground.

FIG. 6, shows a graph demonstrating the temporal relationship between the performance indicating parameter, the power demand indicating parameter, and the state of the vehicle's air conditioner, for an AACSS equipped, automatic transmission vehicle during acceleration on level ground. Curve A shows the vehicle speed in mph, which is the performance indicating parameter in this example. Curve B shows the accelerator pedal position, which is the power demand indicating parameter in this example. Curve C is a logical depiction of whether the realtime value of the vehicle speed is above or below threshold, logical "high" indicating an above threshold value and a logical "low" indicating a below-threshold value. Curve D shows the state of the air conditioner, "high" meaning the air conditioner is on and "low" meaning the air conditioner is off. The horizontal dotted lines show the calculated thresholds for vehicle speed at the particular accelerator pedal positions.

At first the vehicle is travelling at the ideal speed for the given pedal position. At this time the vehicle speed is above the threshold value and the air conditioner is on. As acceleration begins the accelerator pedal is deeply depressed. As shown in curve B, the threshold value at this new accelerator pedal position is far higher than before and the realtime vehicle speed is now well below the threshold indicating a high demand for power. At this time curve C goes low indicating that the condition for shutting off the air conditioner is now met, and curve D goes low indicating that the air conditioner is now off.

Once the desired speed is reached, the operator eases off the accelerator pedal, however the accelerator pedal remains more deeply depressed than it was initially. Once again the vehicle speed is above the threshold speed, since now the vehicle speed is at the ideal level. Once the duration of the condition for turning the air conditioner on is greater than $t_o$, 1 second in this example, the air conditioner is turned on as seen in curve D.

Figure 7:
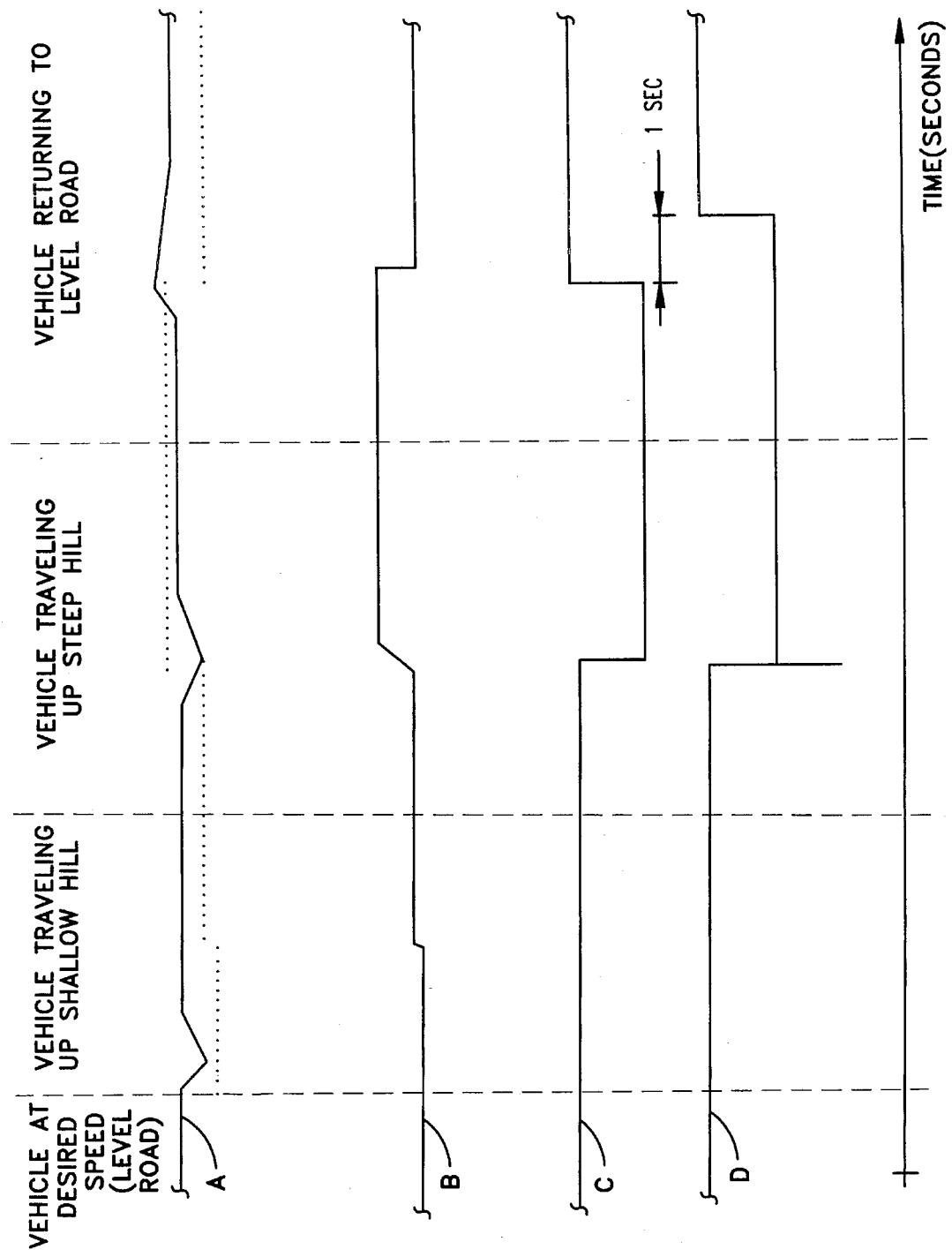
FIG. 7 is a graph demonstrating the temporal relationship between the performance indicating parameter, the power demand indicating parameter, and the state of the vehicle's air conditioner, for an AACSS equipped, automatic transmission vehicle during travel on shallow and steep hills.

FIG. 7, shows a graph demonstrating the temporal relationship between the performance indicating parameter, the power demand indicating parameter, and the state of the vehicle's air conditioner, for an AACSS equipped, automatic transmission vehicle during travel on shallow and steep hills. Curve A shows the vehicle speed in mph, which is the performance indicating parameter in this example. Curve B shows the accelerator pedal position, which is the power demand indicating parameter in this example. Curve C is a logical depiction of whether the realtime value of the vehicle speed is above or below threshold, logical "high" indicating an above threshold value and a logical "low" indicating a below-threshold value. Curve D shows the state of the air conditioner, "high" meaning the air conditioner is on and "low" meaning the air conditioner is off. The horizontal dotted lines show the calculated thresholds for the vehicle speed at the particular accelerator pedal positions.

At first the vehicle is travelling on a level road at the ideal vehicle speed. At this time the vehicle speed is above the threshold value and the air conditioner is on. At steady state on a shallow hill the accelerator pedal is more deeply depressed, however, because of the effect of δ discussed above, the vehicle speed is still above the threshold even though it is less than the ideal speed. The air conditioner remains on.

When climbing a steep hill, the accelerator pedal is even more deeply depressed, and eventually the vehicle speed falls below the calculated threshold value. The realtime vehicle speed is now well below the threshold indicating a high demand for power. At this time curve C goes low indicating that the condition for shutting off the air conditioner is now met, and curve D goes low indicating that the air conditioner is now off.

As the vehicle comes to level ground, the operator eases off the accelerator pedal. Once again the vehicle speed is above the threshold speed, since now the vehicle speed is at the ideal level. Once the vehicle has travelled on level ground for more than 1 second, the duration of the condition for turning the air conditioner on is greater than 1 second, and therefore the air conditioner is turned on as seen in curve D.

FIG. 8, shows the temporal relationship between the detection of the engine being in a running condition (curve A) and the on/off state of the air conditioner (curve B). When curve B is "high" the air conditioner is on, and when curve B is "low" the air conditioner is off. The main feature of FIG. 8 is that there is, as an example only, a 5 second delay between the time the engine is turned on and the time the air conditioner is turned on. This Figure demonstrates the effect of the delay for allowing the engine to obtain stable running condition.

FIG. 9, shows the temporal relationship between the engine or coolant temperature (curve A) and the on/off state of the air conditioner (curve B). When curve B is "high" the air conditioner is on, and when curve B is "low" the air conditioner is off. The main feature of FIG. 9 is that the air conditioner is turned off once the engine or coolant temperature exceeds the preselected threshold.

It is to be understood that the present invention is not limited to the embodiments described above, but encompasses any and all embodiments within the scope of the following claims.

I claim:

1. An automatic air conditioner shutoff system for use with an air conditioner having a compressor which receives power from an engine, said automatic air conditioner shutoff system comprising:

means for sensing the value of a power demand indicating parameter;

means for generating the steady state, level ground value of a performance indicating parameter at a sensed value of the power demand indicating parameter sensed by said means for sensing the value of a power demand indicating parameter;

means for sensing the realtime value of a performance indicating parameter;

means for calculating a performance parameter threshold by reducing said steady state, level ground value of said performance indicating parameter by a user selected percentage;

means for comparing said realtime value of said performance indicating parameter with said performance parameter threshold;

signalling means responsive to said means for comparing said realtime value of said performance indicating parameter with said performance parameter threshold, said signalling means indicating a first signal when said realtime value of said performance indicating parameter is less than said performance parameter threshold, and said signalling means indicating a second signal when said realtime value of said performance indicating parameter is greater than said performance parameter threshold;

means for engaging said compressor to said engine responsive to said signalling means, said means for engaging said compressor to said engine acting to engage said compressor to said engine in response to said second signal, and said means for engaging said compressor to said engine acting to disengage said compressor from said engine in response to said first signal.

2. The automatic air conditioner shutoff system according to claim 1, wherein said means for sensing the realtime value of a performance indicating parameter is a torque sensor.

3. The automatic air conditioner shutoff system according to claim 2, wherein said torque sensor includes a strain gauge provided on a drive axle of a vehicle having said automatic air conditioner shutoff system, said compressor, and said engine mounted therein.

4. The automatic air conditioner shutoff system according to claim 2, wherein said engine has a temperature, and further including:

means for sensing the temperature of said engine; and means for comparing the temperature of said engine with a preselected threshold temperature; and wherein said signalling means is also responsive to said means for comparing the temperature of said engine with a preselected threshold temperature, said signalling means generating said first signal when the temperature of said engine exceeds said threshold temperature.

5. The automatic air conditioner shutoff system according to claim 2, wherein said engine has a coolant having a temperature, and further including:

means for sensing the temperature of said coolant; and means for comparing the temperature of said coolant with a preselected threshold temperature; and wherein said signalling means is also responsive to said means for comparing the temperature of said coolant with a preselected threshold temperature, said signalling means generating said first signal when the temperature of said coolant exceeds said threshold temperature.

6. The automatic air conditioner shutoff system according to claim 2, further including an engine-on/off sensor for sensing when said engine is turned on and when said engine is turned off, and wherein said signalling means is also responsive to said engine-on sensor, said signalling means generating said first signal when the engine is turned off.

7. The automatic air conditioner shutoff system according to claim 6, further including a timer for measuring the elapsed time from the time said engine is first turned on, and means for comparing said elapsed time with a preselected stabilization time interval, and wherein said signalling means generates said second signal only when said elapsed time is no longer less than said preselected stabilization time interval.

8. The automatic air conditioner shutoff system according to claim 2, further including a timer for measuring the elapsed time from the time said realtime value of said performance indicating parameter first becomes greater than said performance parameter threshold, and means for comparing said elapsed time with a preselected time interval, and wherein said signalling means generates said second signal only when said elapsed time is no longer less than said preselected time interval.

9. The automatic air conditioner shutoff system according to claim 1, wherein said means for sensing the realtime value of a performance indicating parameter is an engine speed sensor.

10. The automatic air conditioner shutoff system according to claim 9, wherein said engine has a temperature, and further including:

means for sensing the temperature of said engine; and means for comparing the temperature of said engine with a preselected threshold temperature; and wherein said signalling means is also responsive to said means for comparing the temperature of said engine with a preselected threshold temperature, said signalling means generating said first signal when the temperature of said engine exceeds said threshold temperature.

11. The automatic air conditioner shutoff system according to claim 9, wherein said engine has a coolant having a temperature, and further including:

means for sensing the temperature of said coolant; and means for comparing the temperature of said coolant with a preselected threshold temperature; and wherein said signalling means is also responsive to said means for comparing the temperature of said coolant with a preselected threshold temperature, said signalling means generating said first signal when the temperature of said coolant exceeds said threshold temperature.

12. The automatic air conditioner shutoff system according to claim 9, further including an engine-on/off sensor for sensing when said engine is turned on and when said engine is turned off, and wherein said signalling means is also responsive to said engine-on sensor, said signalling means generating said first signal when the engine is turned off.

13. The automatic air conditioner shutoff system according to claim 12, further including a timer for measuring the elapsed time from the time said engine is first turned on, and means for comparing said elapsed time with a preselected stabilization time interval, and wherein said signalling means generates said second signal only when said elapsed time is no longer less than said preselected stabilization time interval.

14. The automatic air conditioner shutoff system according to claim 9, further including a timer for measuring the elapsed time from the time said realtime value of said performance indicating parameter first becomes greater than said performance parameter threshold, and means for comparing said elapsed time with a preselected time interval, and wherein said signalling means generates said second signal only when said elapsed time is no longer less than said preselected time interval.

15. The automatic air conditioner shutoff system according to claim 1, wherein said means for sensing the realtime value of a performance indicating parameter is a vehicle speed sensor.

16. The automatic air conditioner shutoff system according to claim 15, wherein said engine has a temperature, and further including:

means for sensing the temperature of said engine; and means for comparing the temperature of said engine with a preselected threshold temperature; and wherein said signalling means is also responsive to said means for comparing the temperature of said engine with a preselected threshold temperature, said signalling means generating said first signal when the temperature of said engine exceeds said threshold temperature.

17. The automatic air conditioner shutoff system according to claim 15, wherein said engine has a coolant having a temperature, and further including:

means for sensing the temperature of said coolant; and means for comparing the temperature of said coolant with a preselected threshold temperature; and wherein said signalling means is also responsive to said means for comparing the temperature of said coolant with a preselected threshold temperature, said signalling means generating said first signal when the temperature of said coolant exceeds said threshold temperature.

18. The automatic air conditioner shutoff system according to claim 15, further including an engine-on/off sensor for sensing when said engine is turned on and when said engine is turned off, and wherein said signalling means is also responsive to said engine-on sensor, said signalling means generating said first signal when the engine is turned off.

19. The automatic air conditioner shutoff system according to claim 18, further including a timer for measuring the elapsed time from the time said engine is first turned on, and means for comparing said elapsed time with a preselected stabilization time interval, and wherein said signalling means generates said second signal only when said elapsed time is no longer less than said preselected stabilization time interval.

20. The automatic air conditioner shutoff system according to claim 15, further including a timer for measuring the elapsed time from the time said realtime value of said performance indicating parameter first becomes greater than said performance parameter threshold, and means for comparing said elapsed time with a preselected time interval, and wherein said signalling means generates said second signal only when said elapsed time is no longer less than said preselected time interval.

* * * * *